(No Model.) 3 Sheets—Sheet 1.
C. W. SPONSEL.
BREECH LOADING ORDNANCE.
No. 447,376. Patented Mar. 3, 1891.
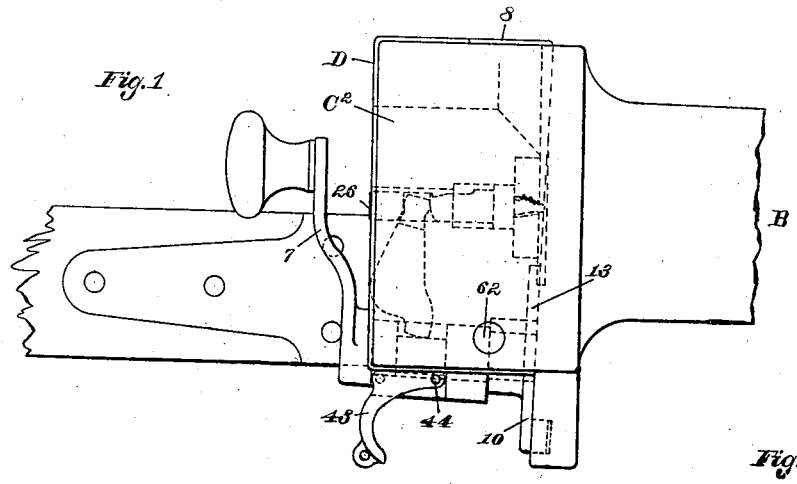
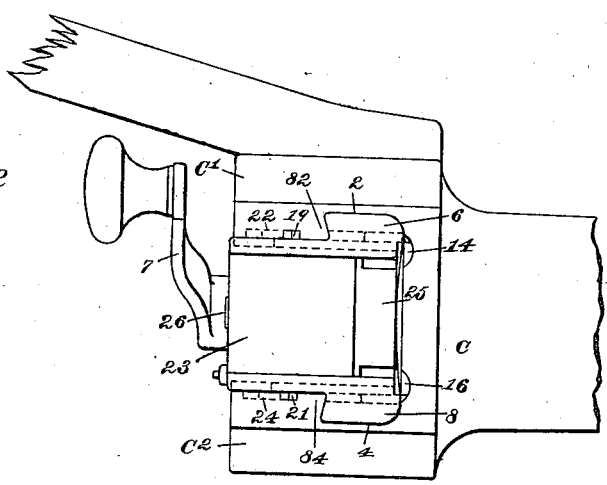
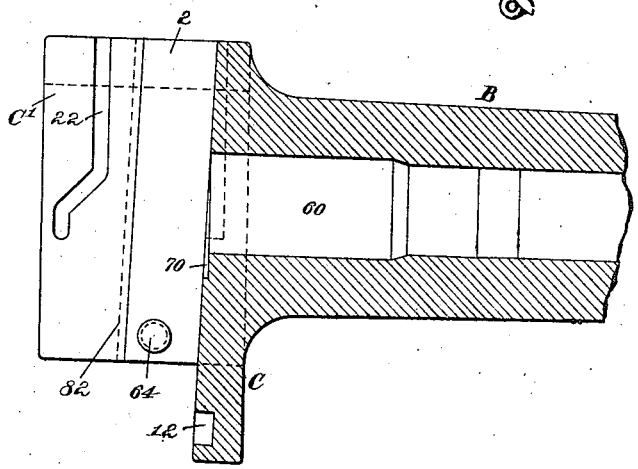
Inventor:
Charles W. Sponsel,
By his Attorney,
F. H. Richards
Witnesses:
Henry L. Reckard
Wm. B. Workman (No Model.) 3 Sheets—Sheet 2.
C. W. SPONSEL.
BREECH LOADING ORDNANCE.
No. 447,376. Patented Mar. 3, 1891.
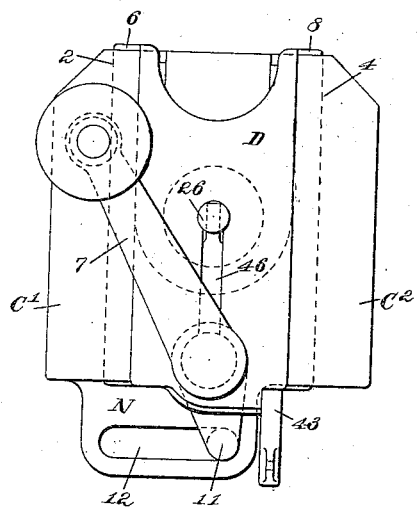
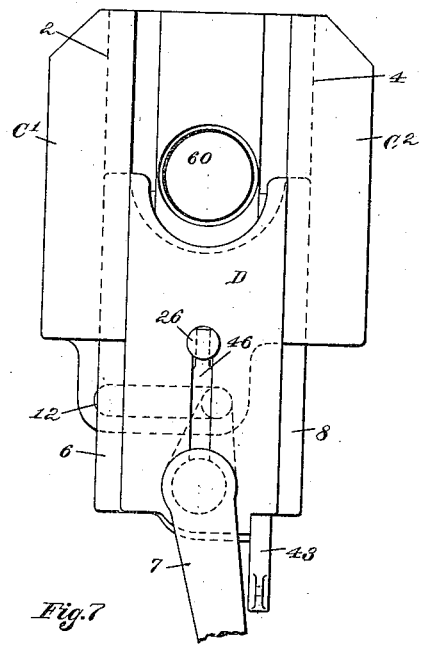
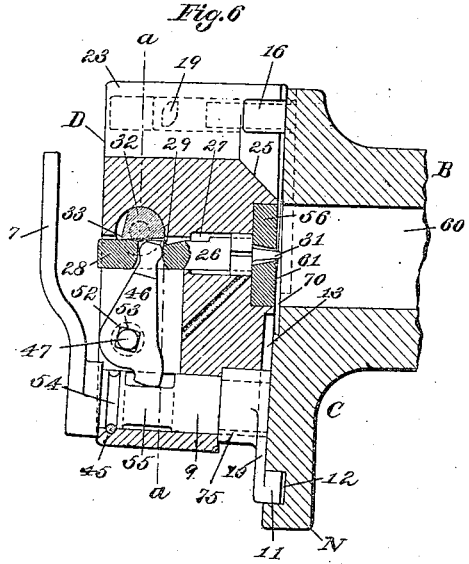
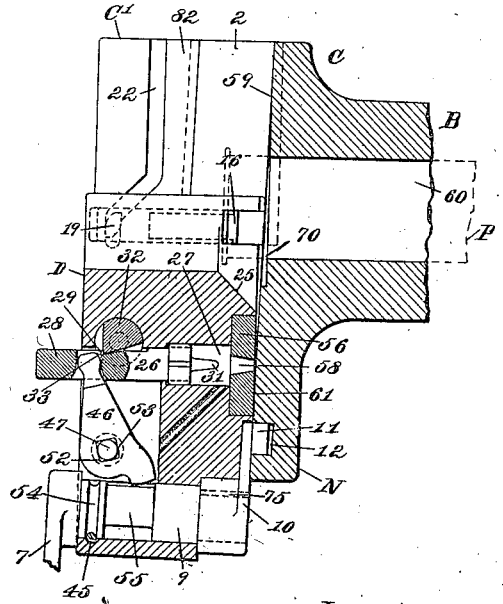
Witnesses:
Henry L. Reckard.
W. M. Bjorkman.
Inventor:
Charles W. Sponsel;
By his Attorney
F. H. Richards (No Model.) 3 Sheets—Sheet 3.
C. W. SPONSEL.
BREECH LOADING ORDNANCE.
No. 447,376. Patented Mar. 3, 1891.
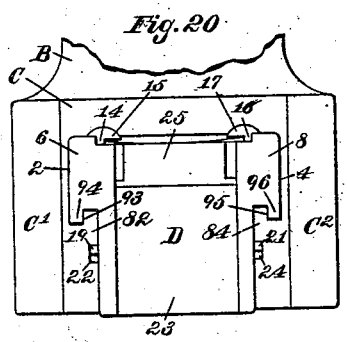
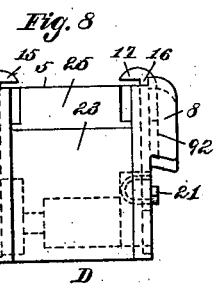
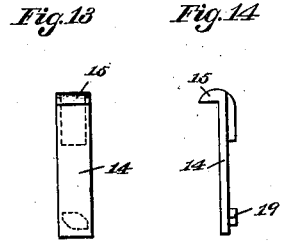
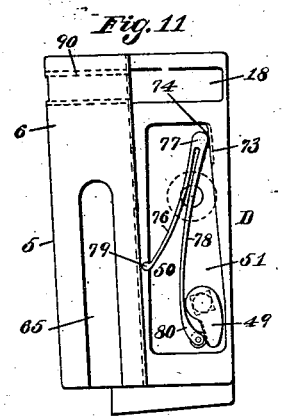
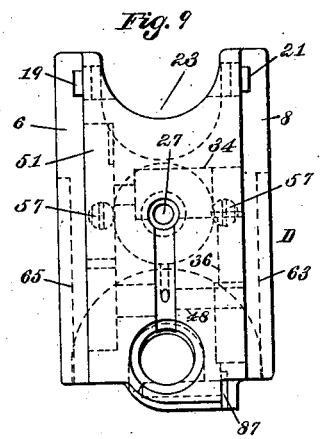
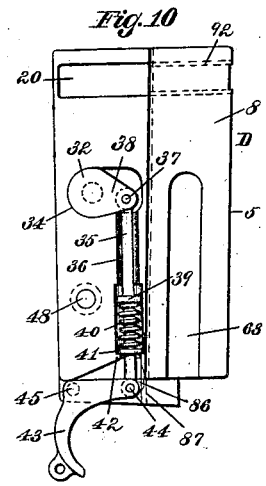
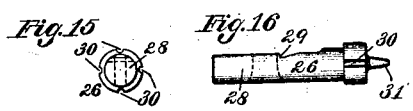
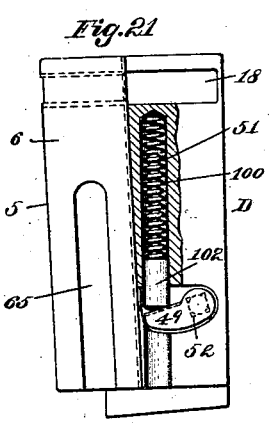
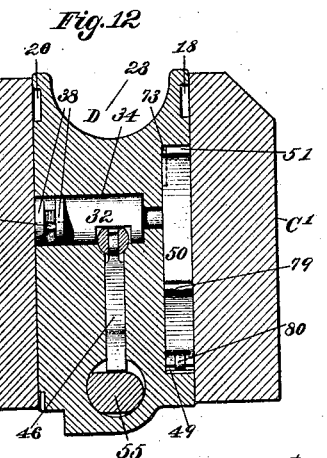
Witnesses:
Henry L. Reckard.
W. M. Byor...
Inventor:
Charles W. Sponsel;
By his Attorney
F. H. Richards.

UNITED STATES PATENT OFFICE.

CHARLES W. SPONSEL, OF HARTFORD, CONNECTICUT.

BREECH-LOADING ORDNANCE.

SPECIFICATION forming part of Letters Patent No. 447,376, dated March 3, 1891.

Application filed April 30, 1890. Serial No. 350,107. (No model.)

*To all whom it may concern:*

Be it known that I, CHARLES W. SPONSEL, a citizen of the United States, residing at Hartford, in the county of Hartford and State of Connecticut, have invented certain new and useful Improvements in Breech-Loading Ordnance, of which the following is a specification.

This invention relates to that class of breech-loading ordnance in which the opening of the breech, extracting the empty shell, and cocking the gun are accomplished by the movement of an actuating-lever in one direction and the closing of the breech and the making ready for firing are accomplished by a movement of the actuating-lever in a contrary direction.

The object of the invention is to provide an organization of mechanism in which all the operative parts may be carried on and by the breech-block and be removable therewith, so that the gun may be quickly dismantled by removal of the breech-block, and so that the size and weight of the breech-piece may be reduced, while preserving sufficient strength; also, to reduce the cost of manufacture by assembling all the working details on the breech-block, whereby the machining operations are much simplified and reduced.

In the drawings accompanying and forming a part of this specification, Figure 1 is a side elevation of a breech-loading cannon embodying my improvements, the barrel and shoulder-rest being broken away. Fig. 2 is a plan view of the same. Fig. 3 is a central vertical section of the barrel, from which the breech-block has been removed. Fig. 4 is a rear view of the cannon, showing the breech-block in its upper or normal position. Fig. 5 is a similar view showing the breech-block down or in its lower position, the cannon being ready to receive a cartridge. Fig. 6 is a central vertical section of the cannon, the parts being shown in the same positions as in Fig. 4. Fig. 7 is a similar view, wherein the positions of the several parts correspond to their positions in Fig. 5. Fig. 8 is a plan view of the breech-block removed from the cannon and having the extractors in place.
Fig. 9 is a rear view of the same. Figs. 10 and 11 are views of the right and left hand sides, respectively, of said block, with some of the minor details in place. Fig. 12 is a cross-section of the cannon, the view being taken in line *a a* of Fig. 6. Figs. 13 and 14 are side and edge views, respectively, of one of the extractors. Figs. 15 and 16 are end and side views, respectively, of the firing-pin. Figs. 17, 18, and 19 are respectively an end, a section, and a side view of the sear, the sectional view being taken in line *b b*, Fig. 19. Fig. 20 shows an alternate form of the breech-block in plan view. Fig. 21 is a view similar to Fig. 11, showing how a coiled spring may be used in place of the flat spring shown in Fig. 11. Fig. 22 is a detail view of the cocking-lever shaft as seen from the right hand in Fig. 11. Figs. 23 and 24 are a plan and side view, respectively, of the trigger, showing said trigger in detail.

Similar characters designate like parts in all the figures.

The cannon consists of a barrel B, united to or formed integral with the enlarged breech-piece C, which is divided to form the two sides C' and C², between which is located the vertically-movable breech-block D. On the inner sides of said sides C' and C², respectively, are formed the grooves or recesses 2 and 4 for receiving the correspondingly-formed projections or ribs 6 and 8 of said sliding block D. Said grooves 2 and 4 are formed somewhat inclined to the vertical, so that as the block D is slid down, as in Figs. 5 and 7, it is carried rearwardly a short distance, thus relieving the pressure against the head of the cartridge (not shown) in the gun-barrel.

In Fig. 20 I have shown an alternate form of the projections 6 and 8, in which the lugs 94 and 96 thereof engage the grooves 93 and 95, that are formed in the sides C' and C² to receive the same. The said projections or bearers 6 and 8 of the breech-block, fitting the slots 2 and 4 of the breech-piece, act as guides for the said block in its up and down movements to close or open the breech of the gun, and, by engaging the abutments 82 84 on the breech-piece, sustain the breech-block against the shock of discharge when the gun is fired.

It will be plainly seen from Figs. 6 and 7 that the front face 5 of the breech-block and the guides above described are cut on a slight angle. When the block D is up, the face 61 of the recoil-plate 56 stands close to the channel 70 for the cartridge-head; but as said block is gradually lowered said face 61 is withdrawn rearwardly until in the lowest position of the breech-block, as in Fig. 7. Said plate 56 stands a short distance from the line of said cartridge-channel. The vertical movements of the breech-block D are accomplished by means of a hand-operated crank or lever 7, which is fixed to the outer end of a short shaft 9, that is journaled in the said block. This shaft has secured thereto by the key or spline 75 a crank or arm 10, provided with a stud or roller 11, which is fitted to play in a slot 12, that is formed in the lower part N of the breech-piece C. The said shaft 9 is set in the block D at right angles to the front face 5 of said block. A recess 13, Figs. 1 and 6, is formed in the lower part of the front face of the said block D, to allow the crank 10 to be turned by the lever 7.

In Figs. 4 and 6 the block D is shown in its upper position, closing the breech of the gun. In Figs. 5 and 7 said block is shown in its lowest position, and the breech is open, ready to receive a cartridge. The block is lowered by turning the lever 7 to the right and downward through a little more than one-half of a circle, and during the said turning of the lever the stud 11 has passed to the left in the slot 12 and returned again to the right, as shown by dotted lines in said Fig. 5. When the movement of the actuating-lever is reversed the breech-block is moved upward and the breech of the gun is again closed, as in Figs. 4 and 6.

The shell remaining in the firing-chamber after a discharge is effectually ejected during the downward movement of the breech-block by means of the extractors 14 and 16, which are fitted to slide horizontally in the grooves 18 and 20, that are formed in the right and left hand sides, respectively, of the block D, near the upper end thereof, and in the mortises 90 and 92, that are formed therefor in the guide-bearers 6 and 8, respectively, of said block.

In the detail views, Figs. 13 and 14, the construction of one of the extractors is more fully shown, it being furnished with the hook end, as 15 or 17, to engage the head of the cartridge-shell, and with the lugs, as 19 or 21, which fit in the cam-grooves 22 and 24, that are formed in the right and left hand inner sides C' and C², respectively, of the breech-piece C. After a discharge has taken place the breech-block is lowered, as above described, and the extractors are carried down with it until the hook ends thereof have engaged the shell, when, on the further downward movement of the said breech-block, the above-described lugs 19 and 21 pass into the lower and angular portion of the cam-grooves 22 and 24, and are thereby suddenly retracted to throw out the shells. For proper coaction with the extractors, the breech-block is hollowed out at the top so as to form a trough 23, the forward part 25 of which trough is inclined, as shown in the drawings, so that the cartridge-shell may begin to withdraw from the bore 60 before the lower surface of said trough 23 comes into alignment with said bore. To reload the cannon, the operator inserts a cartridge P, Fig. 7, into the bore of the barrel, pushing it in as far as possible, or until the flange thereof comes in contact with the hook ends of the extractors. The breech-block now being raised, the angular forward part 25 of the trough 23 engages said cartridge-head and, after the manner of a wedge, forces the cartridge forward, following closely the forward or return movement of the extractors. The final forcing home of the cartridge is accomplished by the forward movement of the breech-block, due to the inclination of its guide-bearers, as hereinbefore set forth.

The firing-pin, designated in a general way by 26, is shown in detail in Figs. 15 and 16, and partially in section in Figs. 6 and 7. Said pin is fitted to move longitudinally in the bore 27 of the breech-block, and preferably consists of the stem 28, flattened on the upper side for a portion of its length, and having an opening or mortise formed therein to receive the upper end of the cocking-lever 46. A notch is also formed in the upper side thereof, the shoulder or face 29 of said notch engaging with the sear 32. The enlarged forward part of the pin has a series of grooves 30 for the escapement of air or gases. The firing-point of the pin is designated by 31.

The sear, designated in a general way by 32, is shown in full view in Fig. 12, in detail in Figs. 17, 18, and 19, and in section in Figs. 6 and 7. The sear is notched to form the detent point or catch 33, to engage the detent-face 29 of the firing-pin 26 when the gun is cocked. As shown in Figs. 10 and 12, the sear is carried in the bore 34 of the breech-block. For disengaging the sear 32 from the firing-pin 26, a rod 35, denominated the "sear-rod," is provided, which rod stands in the recess 36, that is formed for receiving the same in the right-hand side of the breech-block D, and is pivotally connected to the sear 32 by a pin 37 in the ears 38, that are formed therefor on said sear. The sear-rod 35 has formed thereon a flange 39, against which the upper end of the spring 40 bears, and is also provided with a loosely-fitting washer 41 to take the downward thrust of said spring, said washer resting against the shoulder 42 of the recess 36. (See Fig. 10.) The sear-rod 35 is also pivotally connected to the trigger 43 by means of a pin 44. The trigger has a pivot pin or stud 45 formed thereon or fixed thereto, by means of which it is pivotally supported in the breech-block at the lower end thereof, said trigger being held in place by the lug 86, that is formed thereon and which engages the recess 87 that is formed therefor in the breech-block. (See Figs. 9 and 10.) By means of the trigger 43 and the rod 35 the sear is disengaged from the firing-pin, allowing said pin to be thrown forward in a well-known manner to discharge the cartridge, the firing-point 31 striking the usual percussion-cap in the head of the cartridge.

The cocking-lever 46 is carried on the cocking-lever shaft 47, which is fitted to turn freely in the bore 48 of the breech-block, and said shaft has an arm 49 formed on the left-hand end thereof, against which the main or firing spring 50 bears. As shown in Fig. 11, said spring 50 consists of the two leaves 76 and 78, joined at 77 and having a projection 74 at said junction, which projection fits into the recess 73 for the purpose of retaining the said spring in the recess 51, that is formed in the left-hand side of the breech-block therefor. The end 79 of the leaf 76 of said spring engages a notch formed in one side of the recess 51 to receive it. The end 80 of the leaf 78 engages the arm 49 of the cocking-lever shaft 47. In Fig. 21 I have shown an alternate form of mainspring in which said spring is a coil-spring, designated by 100, carried in the recess 51, and having a plunger or slide 102 to engage the arm 49 in a manner easily understood. The shaft 47 has a squared part 52 to fit the similarly-formed hole 53 of the lever 46, so that the said shaft and lever are fixed and move together as if one part.

The cocking of the gun is effected as follows: The hereinbefore-mentioned shaft 9, which may also be denominated the "cocking-cam shaft," has a key slot or groove 54 cut therein. The stem or shaft 45 of the trigger acts as a key fitting in said groove and holding said shaft in place, as will be understood from Figs. 6 and 7. Said shaft 9 has formed thereon the cocking-cam 55, a proper form of which is shown in section in Fig. 12, and which acts through the lever 46 to cock the gun when the operator turns the crank-lever 7 toward the right hand, as hereinbefore stated. The recoil-plate 56 is inserted in the front face 5 of the breech-block and is removably held in place by screws in a well-known manner. A hole 58 is formed in the said recoil-plate, through which the firing-point 31 reaches to strike the cap of the cartridge. A pair of stop-pins, as 62 and 64, Figs. 1 and 3, are fixed in the right and left hand sides, respectively, of the breech-piece C, and project into the oppositely-disposed grooves or slots 63 and 65, that are formed in the sides of the breech-block. Said pins and slots are provided for the purpose of preventing the breech-block from falling or sliding out of the breech-piece during the disassembling of the cannon, and also to limit the downward movement of the breech-block and take the blow thereof, so that the crank will be relieved of the force of said blow.

The general operation of cocking and firing this my improved cannon may be described as follows: Fig. 6 shows the parts in their normal position. If a discharge has previously taken place, the shell of the discharged cartridge is still in the bore 60 of the barrel B. The operator, by means of the crank-lever 7, throws down the breech-block D, as above described, which operates through the extractors to first gradually withdraw the shell and then to quickly further and fully withdraw and throw out to rearward the said shell. At the same time the cocking-cam 55 operates through the cocking-arm 46 to draw back the firing-pin 26 to the position shown in Fig. 7, when the detent-face 33 of the sear is thrown into engagement with the detent-face 29 of said firing-pin by means of the spring 40, locking the firing-pin in said position. This operates, also, to contract the mainspring in a well-known manner. The operator now inserts a cartridge in the bore of the barrel, and then by a reverse movement of the crank-lever 7 raises the block D, which closes the breech. The weights or guides of the breech-block, and grooves therefor in the breech-piece being formed on a slight angle to the axis of the barrel, as above described, the raising of the breech-block gradually forces the cartridge home, as before stated. The reverse movement of the crank-lever does not affect the position of the firing-pin and its accessory parts, they being still locked by the sear. When the breech has been closed, as above described, the operator, by means of the trigger 43, disengages the sear from the firing-pin, which is immediately thrown forward by the mainspring to effect the discharge of the cartridge. The block-actuating shaft 9, being carried by the breech-block itself, is thereby made readily available for operating the firing-pin by means of a cam on said shaft, and the crank-arm 10 engaging a groove of the cannon, which groove is crosswise to the breech-block movement, the turning of the shaft carried by the block not only actuates the block, but also locks the same at the extremes of its sliding movements, as indicated in Figs. 4 and 5, respectively. The shaft 9 has its axis in a vertical plane substantially parallel to the plane of the bore 60 of the barrel B, so that the arm on said shaft engages directly with the front wall N of the breech-piece, and so that the rear end of said shaft passes up between the breech-block sides C' and C² when said block is raised to its uppermost position. The sides C' and C² being entirely unconnected at their rear ends, the block D may be moved from the breech-piece at the top thereof while the shaft 9 is in place if the crank-arm 10 be removed.

Having thus described my invention, I claim—

1. In breech-loading ordnance, the combination, with the barrel and the breech-piece thereof, of the sliding breech-block and the block-actuating shaft carried in said block and having an arm engaging with the body of the cannon, whereby said shaft is carried with the breech-block in its movements.

2. In breech-loading ordnance, the combination, with the breech-piece having a groove crosswise to the breech-block movement, of the sliding breech-block, the block-actuating shaft carried by said block, and a crank-arm on said shaft and engaging said groove, whereby the block is actuated by the turning therein of the shaft carried thereby and is locked at the extremes of its movement by said crank.

3. In breech-loading ordnance, the combination, with the breech-piece having the sides thereof unconnected at their rear ends, of the breech-block sliding between said sides and the block-actuating shaft carried by said block and engaging the front wall of the breech-piece, all being constructed and combined substantially as described, so that the block may be withdrawn with said shaft projecting from the rearward side thereof.

4. In breech-loading ordnance, the combination, with the breech-piece and with the movable breech-block and its crank-shaft carried therein, of the firing-pin located in said block above and substantially parallel with said shaft, and a cam on said shaft constructed and connected, substantially as set forth, to draw back the firing-pin on the turning of the shaft in the block to open the breech.

5. In breech-loading ordnance, the combination, with the breech-block, of the firing-pin and the block-actuating shaft, both carried by said block, a cam on said shaft, and the cocking-lever pivoted in said block and connected to actuate the firing-pin from said cam.

6. In breech-loading ordnance, the combination, with the breech-block, of the shaft 9, having the cam 55, the firing-pin, and lever 46, pivotally supported in said block and engaging said pin and constructed to be operated by said cam.

7. In breech-loading ordnance, the combination, with the breech-block, of the shaft carried thereby and having the cocking-cam, the cocking-lever, the firing-pin, and a main-spring connected to throw forward said pin.

8. In breech-loading ordnance, the combination, substantially as described, with the breech-piece and with the movable breech-block and its actuating crank-shaft carried therein, of the firing-pin located in said block above and substantially parallel with said shaft, the cocking-cam on said shaft, and operatively connected, substantially as set forth, to actuate said pin to draw back the same on the turning of the shaft to lower the breech-block, a mainspring connected to throw forward the firing-pin, and the sear engaging the firing-pin when this is retracted.

9. In breech-loading ordnance, the combination, with the breech-block, of the firing-pin, the block-actuating shaft carried by said block and having the cocking-cam operatively connected to actuate said pin, a mainspring connected to throw forward said pin, the sear 32, fitted to revolve in said block and engage said firing-pin, and a trigger operatively connected to disengage said sear.

10. In breech-loading ordnance, the combination, with the breech-block, of the firing-pin having notch 29, the shaft carried by said block and having the cocking-cam, the lever operatively connecting said cam and firing-pin, the sear 32, having the catch 33, engaging said notch, and means, substantially as described, for operating said sear by hand.

11. In breech-loading ordnance, the combination, with the breech-block, of the block-actuating shaft carried thereby and having the cocking-cam, the firing-pin, the lever operatively connecting said cam and firing-pin and carried by the shaft 47, the shaft 47, having arm 49, and a mainspring bearing on said arm to throw forward said firing-pin.

12. In breech-loading ordnance, the combination, with the breech-block and with the firing-pin 26, having the notch 29, of the sear 32, fitted to turn in a bore in said block and having a catch engaging said pin, and having an arm connected by a rod with the trigger, whereby said sear may be turned to release the firing-pin.

13. In breech-loading ordnance, the combination, with the breech-block and with the block-actuating shaft carried thereby and grooved for a shaft-retaining pin, of the trigger carried on a stem extending into the groove of said shaft and constituting such retaining-pin.

14. In breech-loading ordnance, the combination, with the breech-block and with its actuating-shaft carried therein and having the groove for a retaining-pin, of the trigger having a stem constituting such retaining-pin and having its arm extending under a lug on said block for holding the trigger in place.

15. In breech-loading ordnance, the combination, with the breech-block moving between the sides of the breech-piece, of a reciprocating extractor carried by the block and constructed to have a movement in the block crosswise to the movement of the block and engaging a cam-groove in the breech-piece.

16. In breech-loading ordnance, the combination, with the breech-block moving in the breech-piece, substantially as described, of the extractors constructed with a projection engaging the groove 22 in the breech-piece.

17. In breech-loading ordnance, the combination, with the breech-block moving in the breech-piece, substantially as described, and having the guide-bearer 6, mortised for the extractor, of the extractor 16, sliding in said mortise and provided with the extractor-hook and with a projection engaging a cam-groove in the breech-piece.

CHARLES W. SPONSEL.

Witnesses:
HENRY L. RECKARD,
W. M. BYORKMAN.